United States Patent [19]

Cookson

[11] 4,328,391
[45] May 4, 1982

[54] GAS INSULATED TRANSMISSION LINE HAVING TAPERED PARTICLE TRAPPING RING

[75] Inventor: Alan H. Cookson, Pittsburgh, Pa.

[73] Assignee: The United States of America as represented by the United States Department of Energy, Washington, D.C.

[21] Appl. No.: 226,334

[22] Filed: Jan. 19, 1981

[51] Int. Cl.³ .................... H01B 9/06; H01B 9/04; H02G 5/06
[52] U.S. Cl. .................................. 174/14 R; 174/28
[58] Field of Search ............... 174/14 R, 16 B, 27, 174/28, 29, 99 R, 99 B; 307/147; 361/233

[56] References Cited

U.S. PATENT DOCUMENTS

| | | | |
|---|---|---|---|
| 4,064,353 | 12/1977 | Bolin | 174/14 R |
| 4,084,064 | 4/1978 | Bowman | 174/14 R |
| 4,085,807 | 4/1978 | Bolin | 174/14 R |

Primary Examiner—Laramie E. Askin
Attorney, Agent, or Firm—M. S. Yatsko

[57] ABSTRACT

A gas-insulated transmission line includes an outer sheath, an inner conductor, insulating supports and an insulating gas. A particle-trapping ring is secured to each insulating support, and it is comprised of a central portion and two tapered end portions. The ends of the particle trapping ring have a smaller diameter than the central portion of the ring, so as to enable the use of the particle trapping ring in a curved transmission line.

7 Claims, 6 Drawing Figures

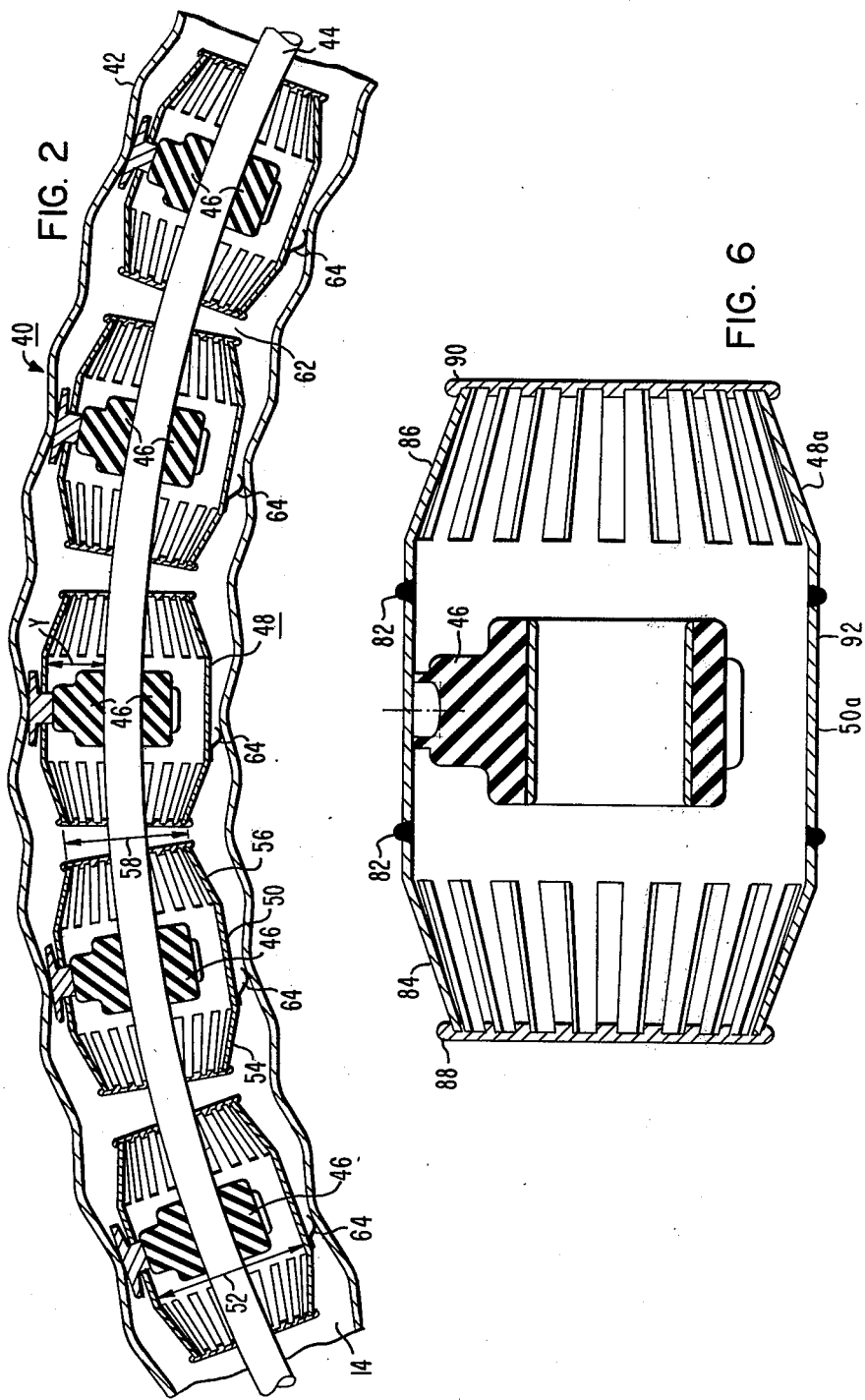

GAS INSULATED TRANSMISSION LINE HAVING TAPERED PARTICLE TRAPPING RING

STATEMENT OF GOVERMENT INTEREST

The Government has rights in this invention pursuant to Contract No. ET-78-C-01-2870 awarded by the United States Department of Energy.

BACKGROUND OF THE INVENTION

This invention relates generally to electrical apparatus, and more particularly to a gas insulated transmission line which utilizes a tapered particle-trapping ring for deactivating contamination particles which may be present within the transmission line.

Present compressed gas insulated transmission lines are mostly of a rigid design with a cylindrical aluminum conductor supported on epoxy insulators inside a cylindrical aluminum sheath, the space between the conductor and the sheath being filled with a high dielectric insulating gas such as sulfur hexafluoride at a pressure typical of which is 50 lbs./sq. in. gauge. Used with the insulators are particle traps which provide low field regions which trap and deactivate contamination particles which may be present within the insulating gas. The particle trap ring generally consists of a metallic straight cylinder surrounding the insulator, with slits or perforations at the bottom of the cylinder which ring is in electrical contact with the outer sheath. Particles moving in the applied field move through these slots to be electrically trapped in the very low field region underneath.

Recently, however, a new design of gas insulated transmission line is being investigated which is of a generally more flexible design. This new flexible transmission line typically uses a corrugated aluminum housing to provide increased flexibility for the outer sheath, thereby enabling the transmission line to change directions more readily. However, the use of the corrugated outer sheath has made particle trapping more difficult; the bottom of the corrugations acts as an inefficient particle trap and particles, when they become levitated, usually cross to the conductor to initiate breakdown in the high field region. Further, it is not possible with the corrugated sheath to be able to move particles in the field along the sheath to the particle traps as is done in the present rigid smooth outer sheath systems.

Furthermore, the use of the present cylindrical particle-trapping rings in the flexible design causes additional problems in that it is necessary to take account of the bending of the flexible outer sheath. For example, if the flexible outer sheath were bent along a radius, the trap diameter would of necessity have to be smaller to accommodate the bending so as to maintain the spaced relationship between the particle trapping ring and the outer sheath. This decreased diameter for the straight cylinder particle-trapping ring would result in a lower insulation distance across the insulator, resulting in an increased possiblity of a flashover occurring at a lower voltage across the insulator.

SUMMARY OF THE INVENTION

In accordance with this invention, an improved gas insulated transmission line is provided which comprises an elongated, hollow sheath with an elongated inner conductor at high potential with respect to the outer sheath being disposed within the outer sheath. An insulating gas electrically insulates the inner conductor from the outer sheath and an insulating spacer insulatably supports the inner conductor within the outer sheath. A longitudinally-extending particle-trapping ring is secured to the spacer and extends longitudinally outwardly therefrom. The particle trapping ring is spaced apart from both the inner conductor and the outer sheath, and the particle trapping ring comprises a central portion and two tapering end portions. The central portion is disposed adjacent the insulating spacer and has a first, fixed diameter. The tapering end portions extend longitudinally outwardly from opposite longitudinal ends of the central portion and additionally extend radially-inwardly towards a second diameter which is smaller than the first diameter of the central portion.

BRIEF DESCRIPTION OF THE DRAWINGS

Reference is now made to the description of the preferred embodiment, illustrated in the accompanying drawings, in which:

FIG. 2 is a sectional view of a gas insulated transmission line according to the teachings of this invention;

FIG. 6 is a modification of the particle trapping ring illustrated in FIG. 5.

DESCRIPTION OF THE PREFERRED EMBODIMENT

Figure 1:
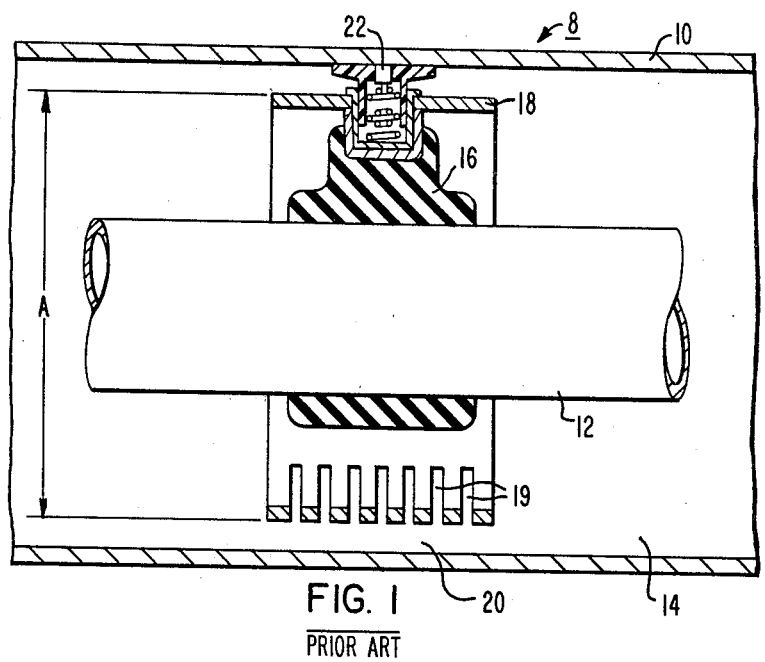
FIG. 1 is a sectional view of a conventional, prior art gas insulated transmission line.

Referring now more particularly to FIG. 1, therein is illustrated a gas-insulated transmission line 8 typical of that common in the prior art. The transmission line 8 is comprised of an elongated, cylindrical outer sheath 10 with an inner conductor 12 disposed within the outer sheath 10. An insulating gas 14 typical of which is sulfur hexafluoride at a pressure of 50 lbs./sq. in. gauge is utilized to electrically insulate the inner conductor 12 from the outer sheath 10. An insulating spacer 16 is used for insulatably supporting the inner conductor 12 within the outer sheath 10. Secured to and disposed about the insulating spacer 16 is a particle trapping ring 18, having a plurality of apertures 19 therein, with the particle trapping ring 18 being spaced apart from the outer sheath 10 so as to form a low field region 20 therebetween for the entrapment of contamination particles. The particle trapping ring 18 is electrically connected to the outer sheath 10 by means such as the constact button 22, which electrical connection may be that as descried in U.S. Pat. No. 4,084,064. The outer sheath 10, the inner conductor 12, and the particle trapping ring 18 would all be of a good, electrically-conducting material such as aluminum.

It should be noted that the particle trapping ring 18 illustrated in the prior art FIG. 1 is of a straight cylindrical design. This ring 18 has a constant diameter A which, because of its use in a rigid cylindrical system, maintains the same approximate spacing from the outer sheath 10 at all points therealong. However, with the increasing investigation of the use of corrugated outer sheaths to provide increased flexibility for transmission lines, this same relationship will not necessarily occur.

Figure 3:
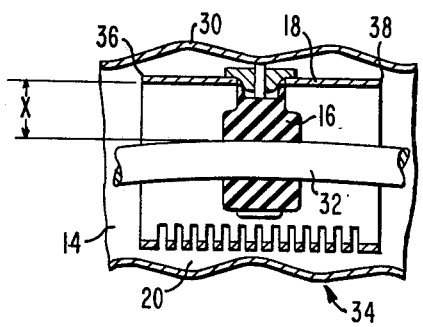
FIG. 3 is a sectional view illustrating the prior art particle-trapping ring in a curved system.

Referring now more particularly to FIG. 3, which illustrates the prior art system utilized with a corrugated outer sheath 30, the transmission line 34 has an inner conductor 32 and the corrugated outer sheath 30 both of which extend along a curve. Because of the radius of curvature of the outer sheath 30, the particle trap ring 18, with its constant inner diameter A, must be closer spaced to the inner conductor 32 than would otherwise be desirable, so as to prevent the longitudinal ends 36, 38 of the prior art particle trapping ring 18 from touching the outer sheath 30 to possibly cause mechanical breakdown which could lead to electrical breakdown and further to restrict the allowable curvature of the outer sheath 30. Therefore, the particle trapping ring 18 must be spaced from the inner conductor 30 a distance such as that designated in FIG. 3 as X, which is also the allowable length of the insulating spacer 16.

Referring now to FIG. 2, therein is illustrated a gas insulated transmission line 40 which utilizes the teachings of this invention. The transmission line 40 is comprised of an elongated, hollow outer sheath 42, which may or may not be corrugated as shown, and an elongated inner conductor 44 disposed within the outer sheath 42. The inner conductor 44 would be at high potential with respect to the outer sheath 42, which typically is at low or ground electrical potential. A plurality of insulating spacers 46 are utilized for insulatably supporting the inner conductor 44 within the outer sheath 42. As in the prior art, an insulating gas 14 is utilized for providing electrical insulation between the inner conductor 44 and the outer sheath 42.

Secured to each insulating spacer 46 is a longitudinally-extending particle-trapping ring 48 which extends longitudinally outwardly from the insulating spacer 46. The particle trapping ring 48 is spaced apart from both the outer sheath 42 and the inner conductor 44. The particle trapping ring 48 comprises a central portion 50 which is disposed adjacent to the spacer 46 and which has a first, fixed inner diameter 52. The particle trapping ring 48 additionally has two tapering end portions 54, 56 which are secured to and extend longitudinally outwardly from opposite longitudinal ends of the central portion 50, and which additionally extend radially inwardly towards a second diameter 58 less than the first diameter 52. As a result, the particle trapping ring 48 is shaped somewhat in the form of a barrel, with the ends 54, 56 having diameters smaller than the mid section 50. As a result, the distance Y between the ring 48 and the inner conductor 44 at the spacer 46 is larger than that which would otherwise be possible with the straight, prior art particle trapping ring, and furthermore the length of insulator 46 allowable between the ring 48 and the inner conductor 44 is increased. As an example, for a 1,200 kilovolt system, the distance X of FIG. 3 utilizing the prior art particle trapping ring 18 would be on the order of 6.5 inches, whereas the distance Y utilizing the particle trapping ring 48 of the present invention would be approximately 8 inches. Therefore, it can be seen that the use of the tapered particle trapping ring 48 provides an increased insulating distance to thereby accommodate greater voltages.

Also to be noted in FIG. 2 is that the particle trapping rings 48 are disposed closely adjacent to each other; this close-spacing provides a virtually continuous particle trap along the entire length of the transmission line 40, for the spaces 62 between the trapping rings 48 are adequately shielded by the rings 48.

Additionally, each particle trapping ring 48 is electrically connected to the outer sheath 42 by means of individual spring contacts 64. While not illustrated, the individual particle trapping rings 48 can be joined together with means such as aluminum straps and then only the end trap need be grounded to the outer sheath 42.

Figure 5:
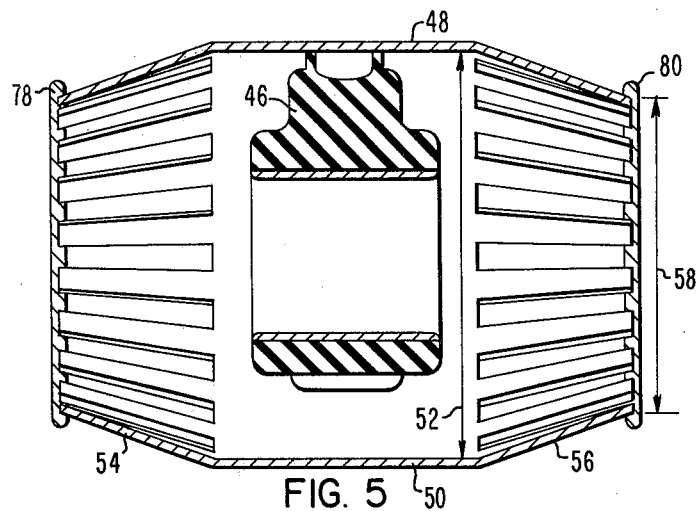
FIG. 5 is a detailed sectional view illustrating formation of the particle-trapping ring.
Figure 4:
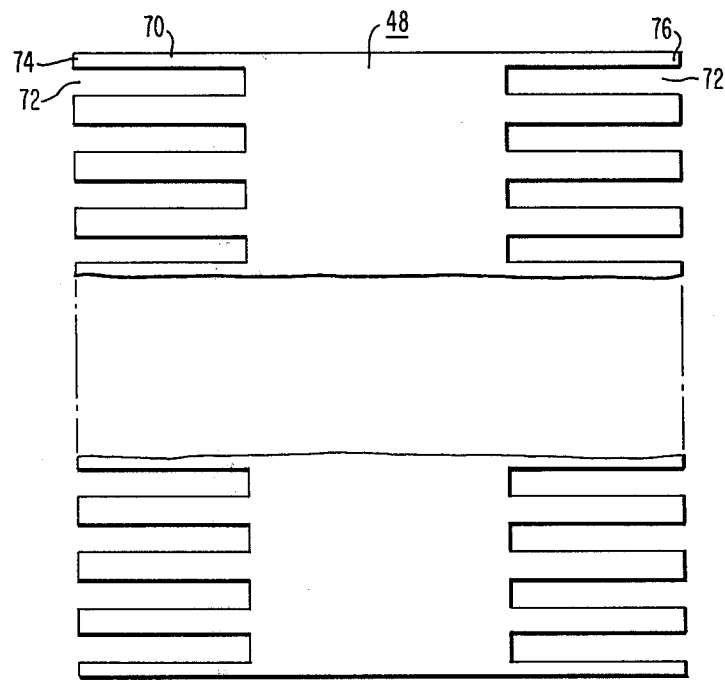
FIG. 4 is a plan view of the particle-trapping ring prior to its formation.

Referring now more particularly to FIGS. 4 and 5, therein is illustrated one method by which the tapered particle trap 48 may be made. As shown in FIG. 4, a solid metal sheet 70 is stamped, for example, with slots 72 at the ends 74, 76 thereof. This sheet 70 is then rolled and welded into a tubular shape, around the insulator 46 (see FIG. 5) and then the ends 74, 76 are bent to form the taper. A toroid 78, 80 is attached to each end 74, 76 respectively to shield the ends electrostatically, and also to fix the ends 74, 76 in their location. The slots 72, in addition to facilitating the tapering, also function to allow entry of the particles into the particle trapping region between the particle trapping ring 48 and the outer sheath 42.

Another method for forming the trapping ring is illustrated in FIG. 6, in which a cylindrical shield 92 forms the central portion 50a of the particle trapping ring 48a, and two spun tapered sections 84, 85 with slots or perforations are attached by means such as the welds 82 to the central, cylinder portion 92. In this design, the spun end pieces themselves have their longitudinal ends 88, 90 spun to reduce the electrostatic fields at the end portions thereof.

Thereof, it can be seen that this invention provides an improved particle-trapping ring which can be utilized with a flexible outer sheath without decreasing the insulator length between the inner conductor and the particle trapping ring.

I claim as my invention:

1. A gas-insulated transmission line comprising:
    an elongated, hollow outer sheath;
    an elongated inner connector at high potential with respect to said outer sheath disposed within said outer sheath;
    an insulating gas electrically insulating said inner conductor from said outer sheath;
    an insulating spacer insulatably supporting said inner conductor within said outer sheath; and
    a longitudinally-extending particle-trapping ring secured to said spacer and extending longitudinally-outwardly therefrom, said particle-trapping ring being spaced-apart from said outer sheath and said inner conductor, said particle-trapping ring comprising a central portion adjacent said spacer having a first, fixed diameter and two tapering end portions extending longitudinally-outwardly from opposite longitudinal ends of said central portion and radially-inwardly towards a second diameter less than said first diameter.

2. The gas insulated transmission line according to claim 1 including a plurality of insulating spacers and a plurality of particle-trapping rings with a particle-trapping ring being secured to each insulating spacer, said particle-trapping rings being disposed longitudinally adjacent to each other.

3. The transmission line according to claim 2 wherein said outer sheath and said inner conductor are disposed along an arc.

4. The transmission line according to claim 1 wherein said outer sheath is corrugated.

5. The transmission line according to claim 1 wherein said particle-trapping ring is of one integral piece.

6. The transmission line according to claim 5 including a toroid secured at the longitudinal end of each of said two tapering end portions.

7. The transmission line according to claim 1 wherein said particle-trapping ring is comprised of said two tapering end portions being welded to said central portion.

* * * * *